March 10, 1970 A. C. NOLTE, JR 3,500,313
VEHICLE GEAR DOWNSHIFTING WARNING INDICATOR
Filed Feb. 11, 1966 2 Sheets-Sheet 1
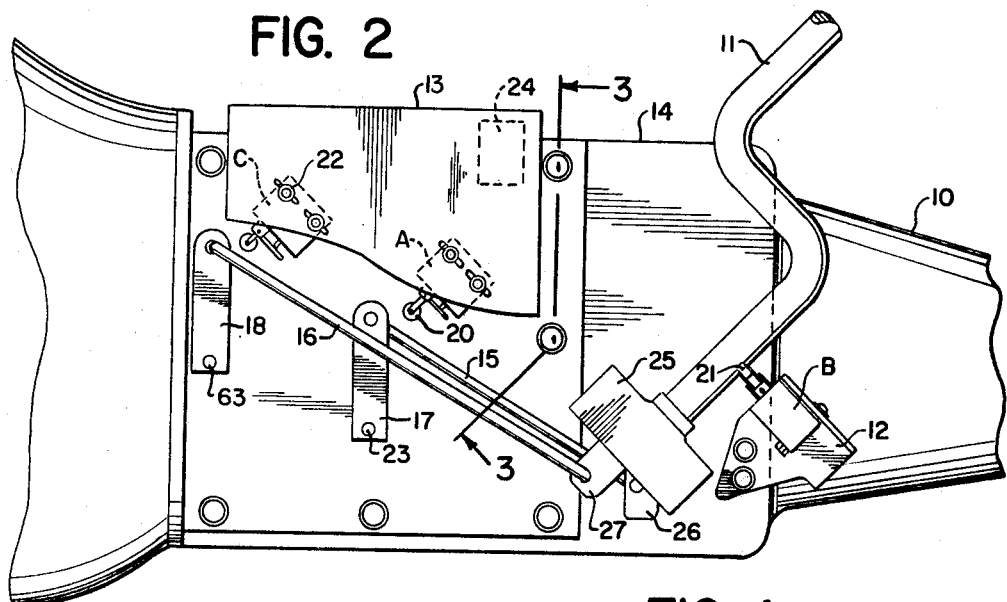
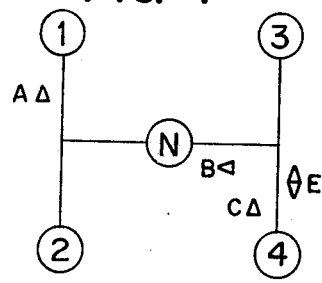
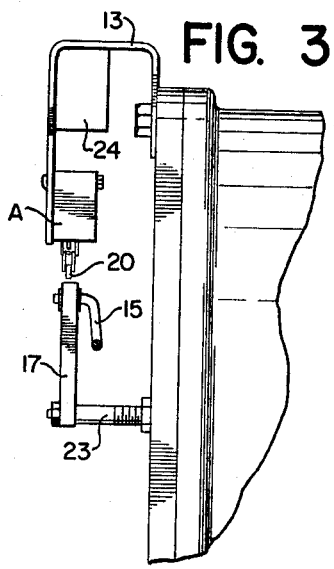
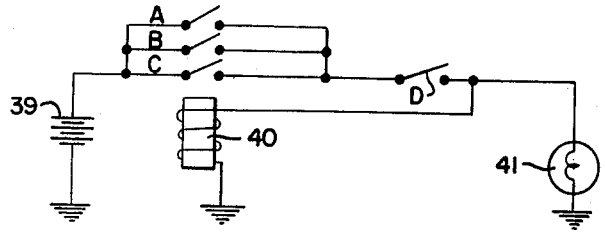
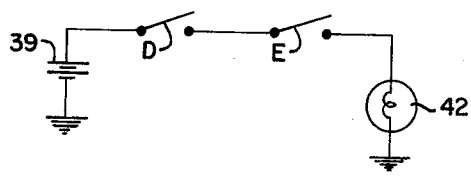
INVENTOR
ALBERT C. NOLTE, JR.
BY
*Nolte and Nolte*
ATTORNEYS March 10, 1970  A. C. NOLTE, JR  3,500,313
VEHICLE GEAR DOWNSHIFTING WARNING INDICATOR
Filed Feb. 11, 1966  2 Sheets-Sheet 2
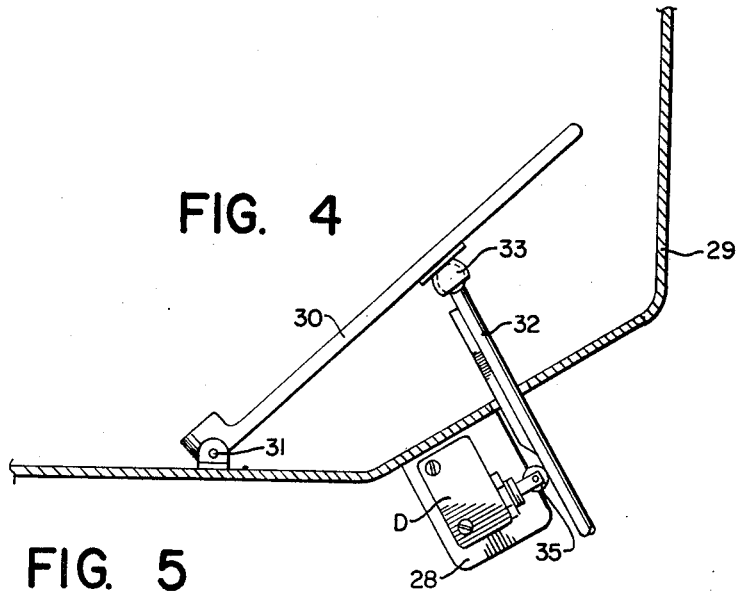
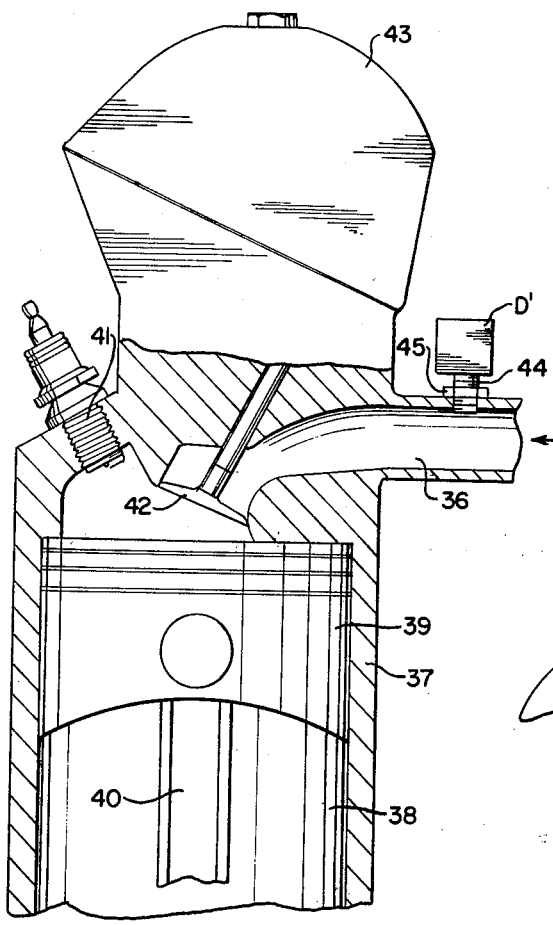
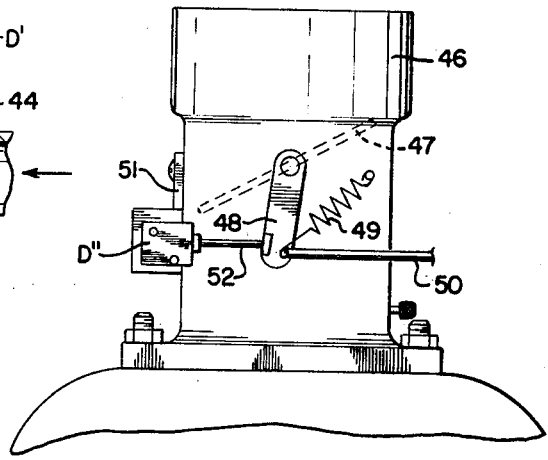
INVENTOR.
ALBERT C. NOLTE, JR.
BY
Nolte and Nolte
ATTORNEYS

United States Patent Office 3,500,313
Patented Mar. 10, 1970

3,500,313
VEHICLE GEAR DOWNSHIFTING WARNING INDICATOR
Albert C. Nolte, Jr., Oyster Bay Cove, N.Y., assignor to Elton Industries Inc., New York, N.Y., a corporation of New York
Filed Feb. 11, 1966, Ser. No. 526,773
Int. Cl. B60q *1/26;* G08b *21/00*
U.S. Cl. 340—71                    9 Claims

ABSTRACT OF THE DISCLOSURE

In a motor vehicle, a series circuit consisting of at least one unidirectional first switch means normally in open position and closed by downshifting in a gear shift mechanism of said vehicle, a second switch means normally in a closed position and opened by a speed acceleration actuation means, electrical indication means, and electrical power supply means.

---

This invention relates generally to a warning indication signal system for vehicles, and in particular, to a warning indicating signal system which is responsive to downshifting in a motor vehicle.

It is a well-known technique to control the speed of the vehicle, particularly when driving around corners or descending a hill, by "downshifting" or lowering the gear ratio between the engine and the drive shaft and releasing the accelerator pedal. In the downshifting operation, the engine itself acts as a braking force on the vehicle without the need of depressing the brake pedal.

It is well known to connect a lamp indicator at the rear of a vehicle to indicate to the driver of a following or trailing vehicle, that the brake pedal is depressed and consequently that the leading vehicle is slowing down. As a result of this indication, the driver of the following or trailing vehicle, is made aware that he also must decelerate his vehicle to avoid a rear end collision. There are also known systems by which a signal is given to the driver of a trailing vehicle to apprise him of the condition of operation of the leading vehicle, e.g., in which gear ratio the leading vehicle is operating. However, there are no such devices known by which a driver operating a manual shifting vehicle can indicate to a trailing vehicle that he is reducing his speed by downshifting.

It is an object of this invention to provide a warning indication of the use of the engine as a braking means for decelerating a vehicle.

It is a further object of the present invention to provide, in a vehicle of the type described, a visual warning indication to the trailing vehicle that the driver in the leading vehicle is reducing his speed by lowering the gear shift ratio and removing acceleration.

It is a further object of this invention to provide such a device which can be easily installed into vehicles of the type described, and which can be readily and economically installed in newly manufactured vehicles.

According to the present invention, at least one unidirectionally operated first switch is placed along the path of motion of the gear shift mechanism. Upon the downshifting motion of the gear shift mechanism, one or more of these switches is actuated. Several switches may be placed in a parallel circuit configuration, such that the activation of one of the switches operates to short-circuit momentarily the remaining parallel first switches. The warning indicator remains "On" until a second switch, responsive to the acceleration of the vehicle, turns off a warning indicator.

This second switch may be connected to respond to the movement of the accelerator linkage, or may be a pressure sensitive switch placed within the exhaust manifold which is energized when the manifold pressure exceeds a predetermined value indicating that the acceleration of the vehicle has been resumed.

In this manner the warning indication is given only while the vehicle is being decelerated by the engine during the downshifting operation, and is turned off upon the resumption of acceleration.

Further features and objects of this invention will become readily apparent from the description below when considered in conjunction with the accompanying drawings whereby the elements have corresponding numbers throughout the several views:

FIG. 1 illustrates a typical H type gear shift pattern, showing the relative positions of the first switches as disposed in accordance with the present invention;

FIG. 2 is an elevation view, partly broken away, of a gear shift lever and linkage mechanism showing the placement of first switches within the gear shift mechanism in accordance with the present invention;

FIG. 3 is a partial view in section taken along lines 3—3 of FIG. 2;

FIG. 4 is a view partly in section, and partly in side elevation of a gas pedal linkage mechanism showing the placement of a second switch responsive to acceleration according to the present invention;

FIG. 5 is a view, partly in section showing the placement of a pressure sensitive second switch within the exhaust manifold of a cylinder in accordance with another embodiment of the present invention;

FIG. 6 is a side elevation view showing a second switch coupled to the butterfly valve linkage in accordance with another embodiment of the present invention;

FIG. 7 is a schematic wiring diagram of a circuit containing the switches and warning light; and The basis of operation of a preferred embodiment of the present invention is shown in the schematic diagram of FIG. 1, which illustrates a typical gear shifting pattern in the form of an H. As shown in FIG. 1, the various gear ratios are represented as being placed at the ends of the legs of the H, the neutral position N, being in the middle of the horizontal cross leg of the H. Switches A, B, C and E are placed along the legs of the gear shifting pattern. The switches are adapted to be momentarily actuated when the gear shift lever, following the H pattern, travels in the direction shown by the arrows in FIG. 1. Switch C, for example, will be actuated when the gear shift lever moves from fourth gear upwards along the H into third gear. Switch B, on the other hand, is actuated when the gear shift lever moves along the horizontal path towards the left as seen in FIG. 1. Therefore, for any possible downshifting operation, at least one of the switches A, B, or C will be actuated by the operation of the gear shift lever and associated linkage, as will be more completely described below.

It is, of course, conceivable that a down-shift operation, such as that from third gear to first gear, be initiated, whereby, more than one of the switches A, B or C will be actuated.

First switches A, B and C are connected in parallel one to another, and in series with the second switch D with a warning indicator or light 41 (see FIG. 7), so that when any one of the three switches is actuated, and the switch D is closed, the light will give a warning indication to the trailing vehicle.

One example by which the inventive concept shown in FIG. 1 may be mechanized is shown by way of illustration in FIGS. 2 and 3, in which switches A, B and C are placed in position with a typical gear shift linkage mechanism.

Referring now to the figures, a housing 10 which contains the drive shaft (not shown) leads into a gear housing 14 in which the gearing mechanism is housed. A gear shift lever 11 is operated in a well-known manner, to place the gears in the proper gear ratios corresponding to the positions shown in FIG. 1 of the H pattern. A bracket 12 is mounted to housing 14, to which a switch B is mounted by suitable means. A bracket 13 is also mounted to the wall of housing 14 to which switches A and C are mounted. Connected to the lower end of gear shift lever 11 is a unit 25 containing direction changing means, such as cams and gearing (not shown) by which the direction of motion of shift lever 11 along the H path is converted to produce axial movement of connecting rods 15 and 16, which are connected to extensions 26 and 27 respectively. Extensions 26 and 27 extend from the unit 25 and are connected to the direction changing means within. Rods 15 and 16 are connected respectively at the other ends thereof to pivot members 17 and 18. The lower ends of pivot shifter members 17 and 18 are fixedly connected to rods 23 and 63 respectively (see FIG. 3), which is operatively connected to the gears within gear housing 14, to place the gears in the desired gear ratio.

As shown in FIG. 2, the upper arcuately shaped ends of pivot shifter members 17 and 18 and actuators 19 and 20 of switches A and C respectively, are located with respect to one another, so that when either of the pivot members is rotated in a clockwise direction, as viewed in FIG. 2, the upper arcuate ends of the pivot shifter members will contact switch actuators 19 and 20 closing either switch A and/or B, depending on which of the shifter members is pivoted through the movement of gear shift lever 11.

When passing through the neutral position, gear shift lever 11 is moved along the path perpendicular to the plane of FIG. 1, and will make contact with an actuator 21 of switch B to actuate switch B.

Referring now to FIG. 1, switch B lies along the horizontal portion of the H so that when the gear shift lever is moved laterally, corresponding to a movement of the gear shift lever at right angles to the plane of FIG. 2, actuator 21 of switch B will be contacted by the lever to actuate the switch.

Switches A, B and C are unidirectionally operated switches, so that these switches will be actuated only upon the desired directions of movement of lever 11 along the H pattern. To facilitate the placement of the switches into the relatively small area of the gear lever linkage, switches A, B and C as well as switches D and E may be of the micro-miniature type. A container 24 is mounted to bracket 13, and contains the connection wire terminals for switches A, B, C and D to form a circuit shown in FIG. 7. Electrical wires from the switches to container 24 are not shown in FIGS. 1 and 2 for sake of clarity.

When one or more of the switches A, B and C is actuated in response to the movement of the gear shift lever, a warning indication such as a light placed at the rear of the vehicle will be energized to provide an indication that the downshifting operation has occurred and the vehicle is thereby slowed down. However, for this warning light to operate as an effective "braking" signal, the light must be turned off upon acceleration of the vehicle. Therefore, provision is also made for another, second switch D which is normally in a closed position and opened upon the acceleration of the vehicle. Switch D is connected in the warning signal circuit in series to open the circuit which has been previously closed by the operation of switches A, B and/or C, to turn off the signal.

In FIG. 4 is shown one embodiment of the second switch D responsive to the acceleration of the vehicle. A bracket 28 is mounted to the underside of a housing 29, to which switch D is mounted by any suitable mounting means. An accelerator pedal 30 is pivotably mounted to the housing by means of pivot means 31 in a known manner, and rod 32 is mounted to the underside of pedal 30 by means of a ball and socket joint 33. Rod 32 is connected to the accelerator linkage mechanism (not shown) to increase or decrease the amount of gas fed to the carburetor, to control the velocity of the vehicle. A longitudinal ridge 34 extends from the left hand portion of rod 32 as shown in FIG. 4. Upon the depression of gas pedal 30 to accelerate the vehicle, the lower end of ridge 34 will engage an actuator 35 of switch D, causing switch D to change its state. The operation of switch D within the signal circuit is described below with references to FIGS. 7 and 8.

In FIG. 5 there is shown an alternate placement of the switch, here labeled D', which is responsive to the acceleration of the vehicle. In the embodiment shown therein, switch D' is mounted within the wall of exhaust manifold 36 which leads the exhaust gases from a cylinder 38, in which a piston 39 carried by rod 40 moves. In the conventional manner, a spark plug 41 provides a spark producing the explosion in cylinder 38, and a valve 42 allows the proper inflow and efflux of the gases during the combustion cycle. Mounted above cylinder block 37 is valve cover member 43 in which the valve opening and closing mechanism is placed. Switch D' having a lower tubular extension 44 which extends into manifold 36, is a pressure sensitive type switch that is actuated in response to the pressure level within exhaust manifold 36. Thus, during the acceleration of the vehicle, the exhaust pressure within manifold 36 is increased to a level at which switch D' is actuated. Means to control the threshold pressure at which switch D' is actuated may be included within the switch circuit or switch mechanism to control the operation of the switch. Tubular connection 44 is mounted to the manifold wall 36 by means of mounting means 45. Therefore, with the embodiment as shown in FIG. 5, and the placement of the pressure switch shown therein, upon the acceleration of the vehicle, the pressure within manifold 36 will increase thus actuating the pressure switch D' which will operate, as described below, to turn off the warning light which had gone on as a result of the braking and downshifting operation of the vehicle.

Another embodiment and placement of the acceleration sensitive switch is shown in FIG. 6, wherein the switch is designated as D". In the embodiment shown therein, switch D" is mounted to a housing 46 of the carburetor by means of a mounting bracket 51. The carburetor is of the well-known type in which the lateral movement of accelerator linkage 50 moving against the force of a spring 49, causes a pivot member 48 to pivot causing the rotation in the vertical plane of butterfly valve 47 which varies the mixture of gas and air in the cylinder. According to the present invention, a rod 52 is urged against pivot member 48 to move parallel to the axis of movement of accelerator linkage 50. As shown in FIG. 6, upon a movement to the right of linkage 50, pivot member 48 will pivot in a counter-clockwise direction causing rod 52 to move towards the right thereby actuating switch D". It will be seen that the actuation of switch D" is a direct function of the operation of the accelerator. Switch D" upon being actuated operates in a manner similar to that of switches D and D', to open the warning circuit.

FIG. 7 is an electrical schematic diagram showing the manner in which the various switches operate to produce the desired braking signal indication to the trailing vehicle. A voltage source, such as battery 39, is connected in series with a parallel combination of switches A, B and C, and in turn in series with a switch D and a lamp 41. It is to be understood that switches D' and D" shown in the embodiments of FIGS. 5 and 6 may replace switch D in the circuit, depending on which embodiment of the acceleration sensing switch is used.

Coupled to each of switches A, B and C are relay coils respectively which would serve to maintain the switches in a closed position when the coils are energized. For simplification it is shown a single relay coil 40 which is connected across indicator 41 and consequently is in series with switches A, B, C and D. Switch D is in a normally closed position, and switches A, B and C are in a normally open position when the vehicle is traveling at constant speed or accelerating. Upon the activation of either switch A, B and/or C, the circuits between the battery 39 and the lamp 41, and battery and relay 40 are both closed causing lamp 41 to immediately light. The energization of relay 40 causes switches A, B, and C to remain in closed position so that even after the initial actuation of the switches due to the motion of gear shift lever 11 and the linkage mechanism, the switches continue to be closed as long as relay 40 is energized. Until the automobile is subsequently accelerated, switch D is maintained in the closed position and light 41 will continue to remain on to give a braking indication. Switches D, D' and D" are opened by the subsequent acceleration of the automobile by the operation of the construction shown in FIGS. 4, 5 and 6 respectively. The opening of switches D, D' or D" opens the circuit including light 41 and relay 40, causing relay coils 40 to de-energize and thereby releasing switches A, B and/or C so that the switches now resume their normally open position. Lamp 41 is thereupon disconnected from battery 39, causing the warning light to be turned off.

While I have shown several preferred embodiments of my invention, it is obvious that variations may be made thereto, without departing from the scope of my invention as defined in the claims appended below.

What I claim is:

1. A deceleration warning indicator in a motor vehicle, comprising, an electrical circuit including an electrical power supply, an electrical warning indication device, an electrical warning deactivating device including unidirectional first switch means being normally in an open position and coupled to the vehicle shift gear mechanism for being closed by a downshifting motion of the latter and a second switch means being normally in a closed position whereby when said first switch means is closed by said downshifting motion said electrical circuit is activated by said electrical warning device, and acceleration means operatively connected to said deactivating device operative upon achieving a predetermined vehicle acceleration for opening said second switch means and deactivating said electrical warning device.

2. The indicator as recited in claim 1, wherein said deactivating device is mounted in communication with the exhaust manifold of the engine and said second switch means is a pressure sensitive switch disposed within said exhaust manifold.

3. The indicator according to claim 1, wherein said first switch means is in the path of operation of the gear shift lever.

4. The indicator according to claim 1, wherein said first switch means is placed along the path of the gear shift linkage.

5. The indicator according to claim 1, wherein said acceleration means is an accelerator with the pedal thereof being coupled to said deactivating device.

6. The indicator according to claim 1, wherein said deactivating device is a gas mixture control valve of the engine and said second switch means is operationally coupled thereto.

7. The indicator according to claim 1 further comprising a relay coil and wherein said first switch means is a momentary switch magnetically coupled with said relay coil connected in parallel to said electrical warning indicator device.

8. The indicator according to claim 1 wherein said electrical warning indication means are brake lights.

9. The indicator according to claim 1 wherein a plurality of said first switch means is connected in parallel one to the other.

References Cited

UNITED STATES PATENTS

| 2,711,525 | 6/1955 | Kelley | 340—52 |
| 2,751,580 | 6/1956 | Stump | 340—74 XR |
| 3,332,061 | 7/1967 | Levitz | 340—74 XR |

ALVIN H. WARING, Primary Examiner

U.S. Cl. X.R.

200—61.44, 61.88; 340—262